(12) United States Patent
Hsiang (10) Patent No.: US 10,848,705 B1
(45) Date of Patent: Nov. 24, 2020

(54) NIGHT-VIEWING DEVICE

(71) Applicant: New Pocket Device Corp., New Taipei (TW)

(72) Inventor: Chang Pei Hsiang, New Taipei (TW)

(73) Assignee: NEW POCKET DEVICE CORP., New Taipei (TW)

( * ) Notice: Subject to any disclaimer, the term of this patent is extended or adjusted under 35 U.S.C. 154(b) by 0 days.

(21) Appl. No.: 16/795,631

(22) Filed: Feb. 20, 2020

(51) Int. Cl.
*H04N 5/58* (2006.01)
*H04N 5/232* (2006.01)
*H04N 5/225* (2006.01)

(52) U.S. Cl.
CPC ............ *H04N 5/58* (2013.01); *H04N 5/2254* (2013.01); *H04N 5/23245* (2013.01); *H04N 5/232127* (2018.08)

(58) Field of Classification Search
CPC ............... H04N 5/58; H04N 5/23245; H04N 5/232127; H04N 5/2254
USPC .......................................................... 348/602
See application file for complete search history.

(56) References Cited

U.S. PATENT DOCUMENTS

| | | | | |
|---|---|---|---|---|
| 8,336,777 B1* | 12/2012 | Pantuso | ........... | F41G 3/16 235/409 |
| 8,908,054 B1* | 12/2014 | Koenck | ........... | H04N 5/232123 348/218.1 |
| 9,164,367 B2* | 10/2015 | Chang | ........... | G03B 21/28 |
| 2008/0151052 A1* | 6/2008 | Erel | ........... | H04N 5/2256 348/143 |
| 2009/0064514 A1* | 3/2009 | Roes | ........... | F41G 1/36 33/227 |
| 2009/0223072 A1* | 9/2009 | Morin | ........... | F41G 1/14 33/263 |
| 2010/0283404 A1* | 11/2010 | Thoren, Sr. | ........... | F41G 1/473 315/294 |
| 2011/0089325 A1* | 4/2011 | Ottney | ........... | H04N 5/33 250/333 |
| 2011/0173822 A1* | 7/2011 | Cranton | ........... | G01M 11/04 33/263 |
| 2018/0216914 A1* | 8/2018 | Houde-Walter | ........... | F41G 3/145 |

* cited by examiner

*Primary Examiner* — Michael Lee
(74) *Attorney, Agent, or Firm* — Bacon & Thomas, PLLC (57) ABSTRACT

A night-viewing device for use in an environment lacking light source, comprising a first image capturing module, a second image capturing module, a first light source illumination module and a second light source illumination module. The focal ranges of both image capturing modules are different. Meanwhile, the light output angles of both light source illumination modules are also different. When one of the image capturing modules is activated, a control module may select, in accordance with the change of the focal range of both image capturing modules, one of the light source illumination modules whose light output angle is greater than the focal range to drive it in operation such that the generated infrared light may cover the current focal range. In this way, when in observation at a large angle, it can effectively prevent the problem of the excessive darkness around the image capturing angle. Meanwhile, when in observation at a small angle, it can also avoid the insufficient energy concentration and the insufficient illumination distance due to the too large focusing angle of the light source.

10 Claims, 10 Drawing Sheets

NIGHT-VIEWING DEVICE

BACKGROUND OF INVENTION

(1) Field of the Invention

The present disclosure relates to an image capturing module allowing for an optical zoom function, more particularly to a night-viewing device which ensures the miniaturization in conjunction with the structure of an auxiliary light source and provides a plurality of different light output angles for illumination according to the focal length currently used by the image capturing module.

(2) Brief Description of Related Art

There are several types of night-viewing devices. For example, a night-viewing device can be provided with a set of zoomable image capture modules and a set of light source illumination modules. However, the light output angle of the light source illumination module is usually constant. On the one hand, it is easy to cause the problem of excessive darkness around the image capturing environment when the image capturing angle of the image capturing module is greater than the light output angle of the light source illumination module. On the other hand, if the light output angle of the light source illumination module is designed to be the maximum angle of the zoomable image capture module, the auxiliary light source module does not have enough energy concentration in case of making small-angle long-distance observations, thereby causing the problem of insufficient observation distance.

In order to resolve this problem, the industry has developed a light source illumination module to be a zoomable night-viewing device. There are many ways to fabricate the zoomable light source illumination module. For example, a convex lens with an infrared LED can be applied to change the distance between the convex lens and the infrared LED to achieve the zoom function. In order to achieve the automatic control of the zoom function, it is necessary to operate with a motor and corresponding transmission mechanism. In this way, the volume of the entire night-viewing device becomes relatively large. Moreover, the zoom efficiency achieved by the infrared LED with a single convex lens is usually unsatisfactory. However, if the light source illumination module is manufactured by a multi-lens structure with a transmission mechanism for improving the luminous efficiency, the volume will be larger, and the manufacturing cost for the night-viewing device itself will be increased, too. Likewise, the image capturing module using a single zoom lens will also reduce the competitiveness of the product because the general zoom lens for capturing the image is usually too large. Therefore, it is necessary to resolve the above-mentioned problems.

SUMMARY OF INVENTION

Based on the above-mentioned problems, it is a primary object of the present disclosure to provide a night-viewing device having zoomable image capturing modules in cooperation with auxiliary light source structure for achieving the miniaturizing effect. Meanwhile, the night-viewing device may provide several different light output angles in accordance with the observation angle of the image capturing module, thereby avoiding the excessive darkness around the viewing angle or the insufficient observation distance.

According to the present disclosure, a night-viewing device includes a first image capturing module, a second image capturing module, a first light source illumination module and a second light source illumination module. The focal ranges of both image capturing modules are different. Meanwhile, the light output angles of both light source illumination modules are also different. Because the two image capture modules have different focal lengths, the captured images can be cropped and reorganized with the digital zoom function of the control module, thereby achieving a simple continuous zoom function. The first light source illumination module and the second light source illumination module are composed of an infrared light-emitting diode packaged in a condenser lens. When one of the image capturing modules is activated, a control module may select, in accordance with the change of the focal range of both image capturing modules, one of the light source illumination modules whose light output angle is greater than the focal range to drive it in operation such that the generated infrared light may cover the current focal range. In this way, it can effectively prevent the problem of the excessive darkness around the image capturing angle. Meanwhile, it can also avoid the insufficient energy concentration due to the too large illumination angle of the light source. Furthermore, the entire volume of the night-viewing device may be avoided by miniaturizing the structure of the two image capturing modules and the auxiliary light sources.

DETAILED DESCRIPTION OF PREFERRED EMBODIMENTS

To make it easier for our examiner to understand the objective of the present disclosure, its features, and advantages, we use a preferred embodiment together with the attached drawings for the detailed description of the disclosure.

Figure 1:
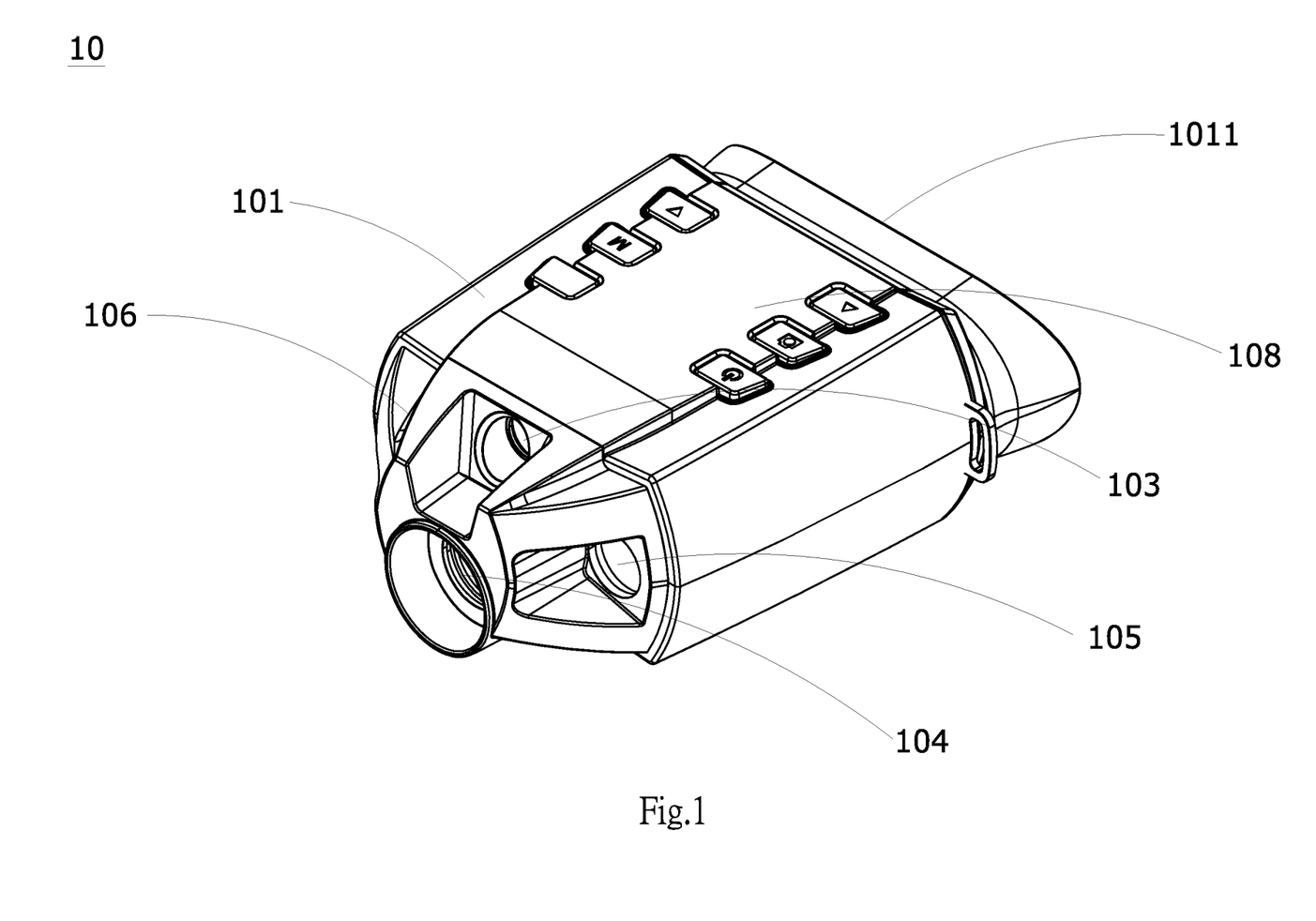
FIG. 1 is a perspective view of the present disclosure.

With reference to FIG. 1, a night-viewing device 10 according to the present disclosure includes an external housing 101. A viewing portion 1011 is disposed at one end of the external housing 101 and can correspond to the eyes of the user. A first image capturing module 103 and a second image capturing module 104 are disposed at the other end of the external housing 101. A first light source illumination module 105 and a second light source illumination module 106 are positioned adjacent to the first image capturing module 103 and the second image capturing module 104, respectively. An operation module 108 is positioned on the outside of the external housing 101. The above-mentioned modules (103-106) can be activated by the operation module 108.

Figure 2:
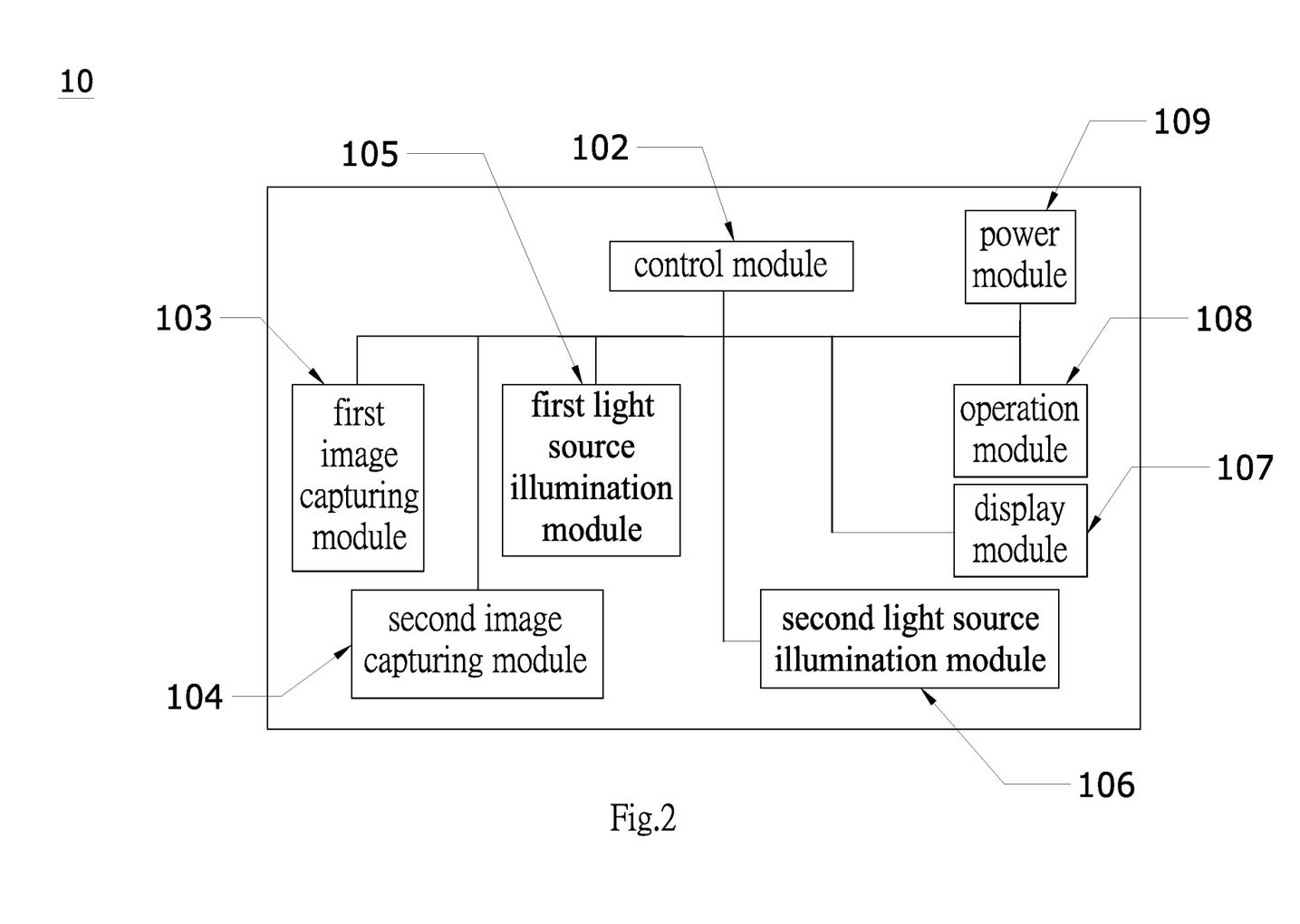
FIG. 2 is a schematic block diagram of a first embodiment of the present disclosure.

Referring to FIG. 2, the night-viewing device 10 mainly includes a control module 102. The control module 102 is electrically connected with the first image capturing module 103, the second image capturing module 104, the first light source illumination module 105, the second light source illumination module 106, a display module 107, the operation module 108, and a power module 109, respectively. The control module 102 can be employed to operate the night-viewing device 10 and to control the operation of the above-mentioned modules (103-107). The control module 102 may fulfill many functions such as logic operations, temporary storage of operation results, and storage of execution instruction positions. The control module 102 can be a CPU or may further include a GPU (Graphics Processing Unit) for performing more detailed post-processing on the night-viewing image, for example: removing thermal noise, enhancing the contour of the object in the night-viewing image, etc. The first image capturing module 103 and the second image capturing module 104 may be lens modules made of, for example, a CCD (Charge-Coupled Device) or a CMOS (Complementary Metal-Oxide-Semiconductor). Moreover, the focal lengths of the first image capturing module 103 and the second image capturing module 104 are different. The first image capture module 103 may be, for example, a lens module with a focal length of 4 mm, while the second image capture module 104 may be a lens module with a focal length of 35 mm, so that both of the image capture modules 103, 104 are able to capture the night-viewing image information of an object at night with a wide viewing angle of short range or a long range of narrow viewing angles. In cooperation with the digital zoom function in the control module 102, the output image of this device achieves a continuous zoom effect. The first light source illumination module 105 and the second light source illumination module 106 serves for emitting the infrared light. The first light source illumination module 105 and the second light source illumination module 106 may be, for example, a light emitting module whose Infrared Light Emitting Diode (IR LED) is packaged in a condenser lens. The wavelength of infrared light lies usually between 850 nm and 940 nm. The light output angles of the first light source illumination module 105 and the second light source illumination module 106 are different. The light output angle of the first light source illumination module 105 may be, for example, 80 degrees, while the light output angle of the second light source illumination module 106 may be, for example, 30 degrees. The display module 107 can display night-viewing image information for users to watch through the eyes. The operation module 108 can be employed by the user to further instruct the control module 102 to drive the relevant module to operate. The power module 109 is employed to provide the power required by each module. It can transmit power to each module through the control module 102. The power module 109 can also be electrically connected to the modules for supplying power directly. The power module 109 can be directly built into the night-viewing device 10. Alternatively, the power module 109 can be replaced by battery power, but it is not limited thereto.

Figure 3:
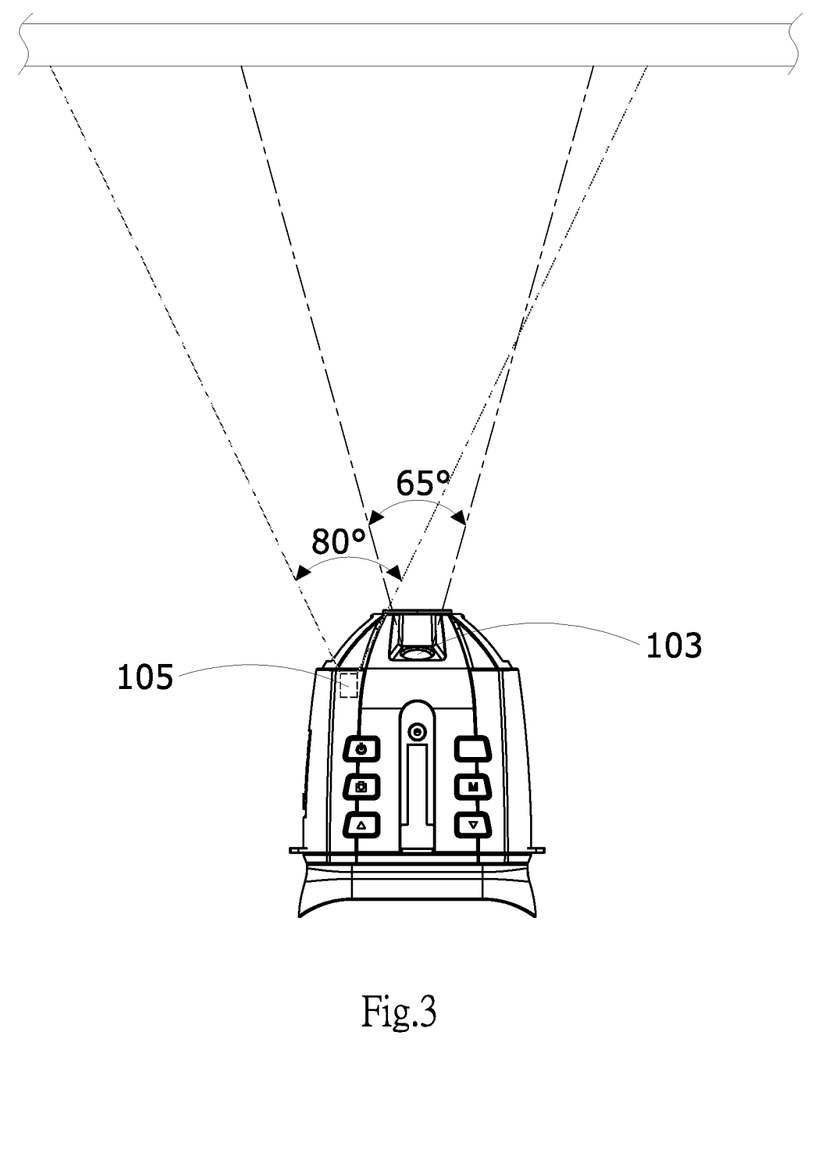
FIG. 3 is a schematic drawing I of the operation of the present disclosure.
Figure 4:
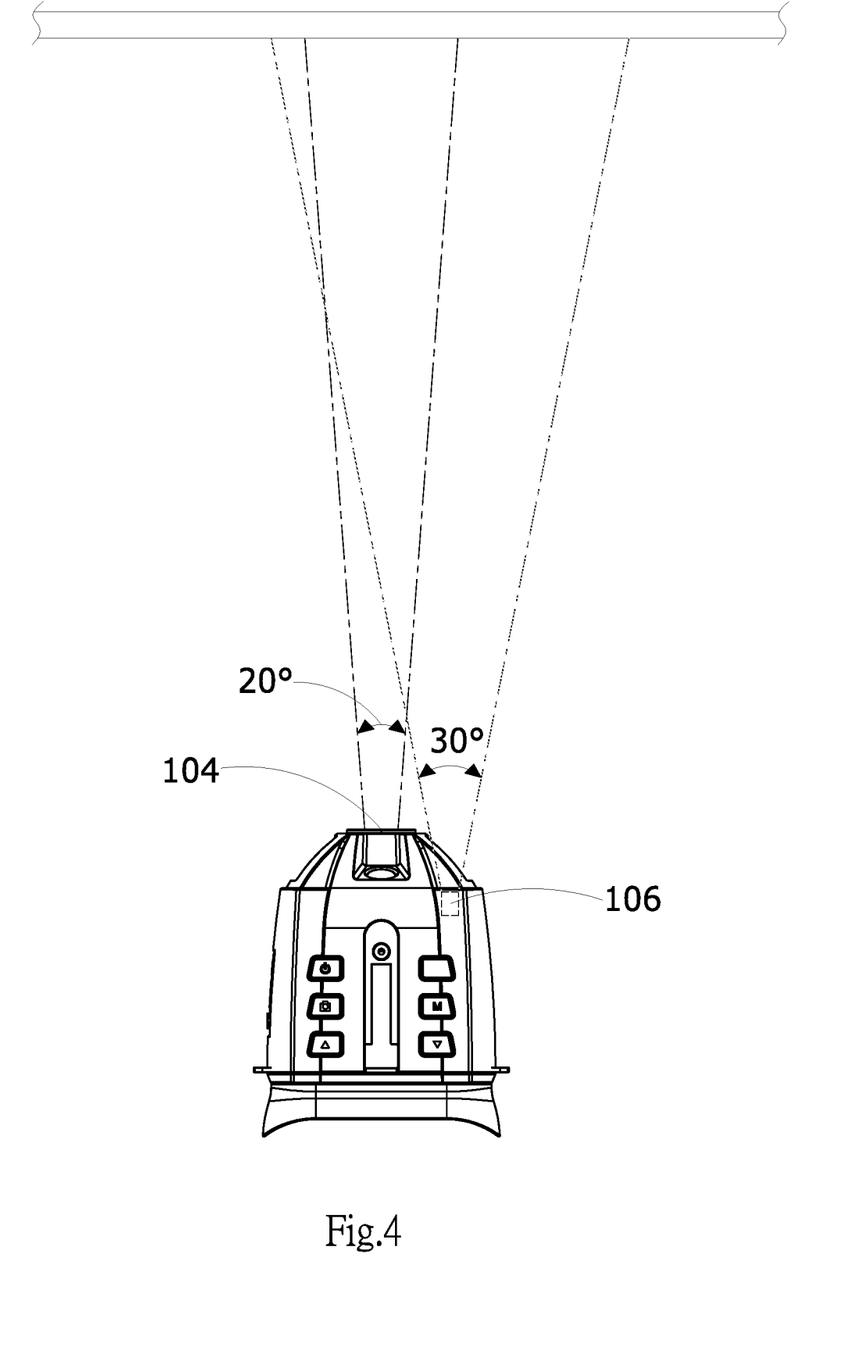
FIG. 4 is a schematic drawing II of the operation of the present disclosure.

Referring to FIG. 3 together with FIG. 2, after the first image capturing module 103 is driven by the control module 102 and when the focal range of the first image capturing module 103 is changed so that the zoom magnification reaches 1.2 times (1.2×), the viewing angle range at this time is about 65 degrees (that is, the viewing field is about 65 degrees). When the viewing angle range of the first image capturing module 103 is about 65 degrees, the control module 102 can produce a corresponding control signal according to a preset algorithm to control the first light source illumination module 105 to emit corresponding infrared light at a light output angle of 80 degrees. Therefore, the range of infrared light emitted by the first light source illuminating module 105 can cover the 65-degree viewing angle range of the first image capturing module 103, thereby effectively preventing the problem of excessive darkness around the viewing angle due to insufficient light illumination. Referring to FIG. 4, when the focal range continues to change and the zoom magnification reaches 4 times (4×), the viewing angle range at this time becomes narrower, only about 20 degrees (that is, the viewing field is about 20 degrees). When the viewing angle range of the second image capturing module 104 is 20 degrees, in order to enable the infrared light to be more concentrated and to illuminate over a longer distance, the control module 102 may generate a corresponding control signal according to a preset algorithm to control the second light source to emit corresponding infrared light at a light output angle of 30 degrees. Therefore, the range of infrared light emitted by the second light source illumination module 106 can cover the 20-degree viewing angle range of the first image capturing module 103, thereby effectively preventing the problem of excessive darkness around the viewing angle due to insufficient light illumination.

Figure 5:
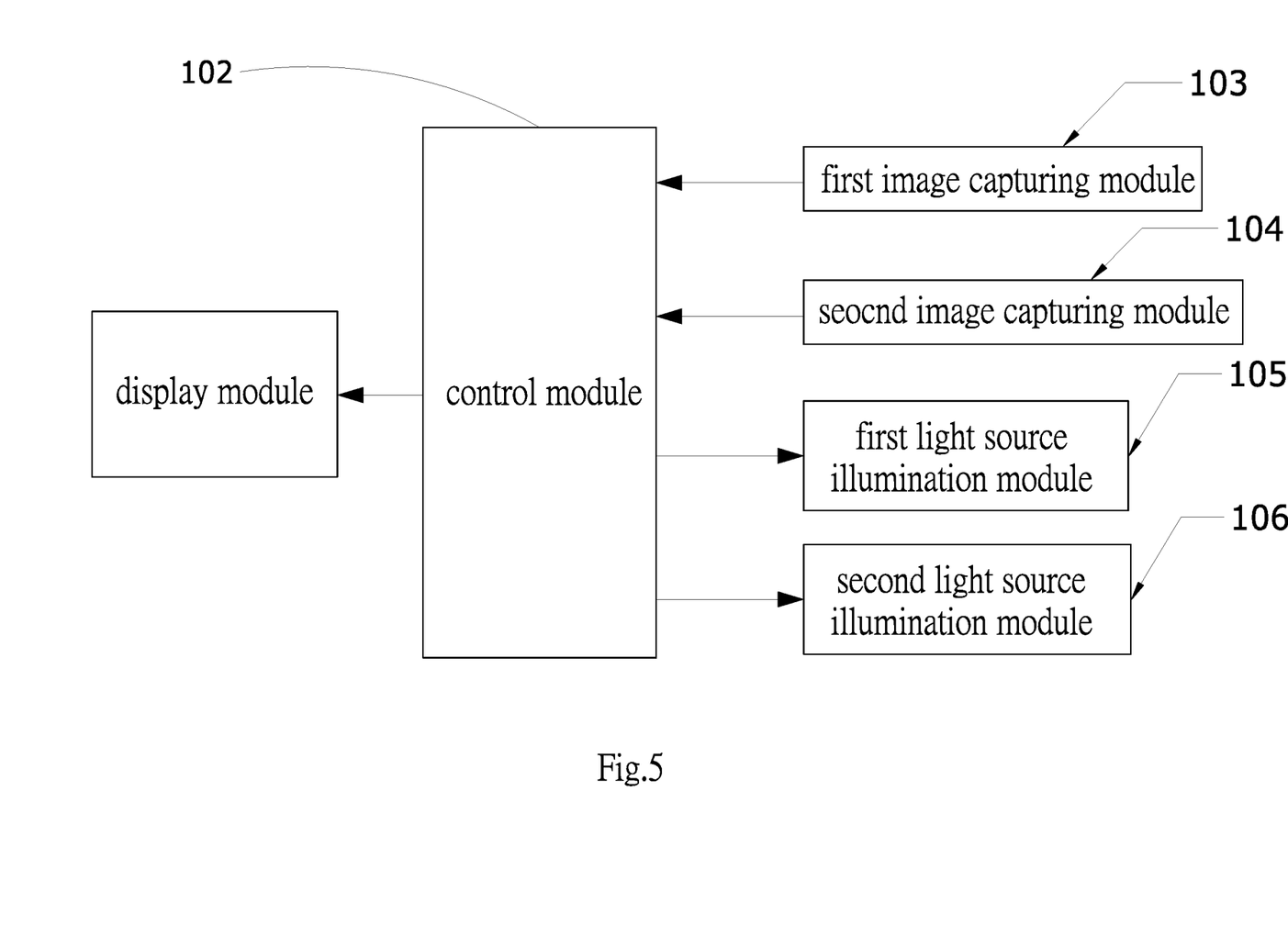
FIG. 5 is a schematic drawing III of the operation of the present disclosure.

Referring to FIG. 5, FIG. 3 and FIG. 4, the control module 102 can activate the first light source illumination module 105 or the second light source illumination module 106 that fulfills the change the focal range according to the change the focal range of the first image capture module 103 and the second image capture module 104 at that time. In other words, the maximum light output angle of the two light source illumination modules 105, 106 is slightly larger than the maximum viewing angle formed by the focal range of the two image capture modules 103, 104 so that both image capture modules 103, 104 are able to obtain sufficient light output angles for auxiliary lighting in the viewing field to avoid the excessive darkness around the viewing angle.

Figure 6:
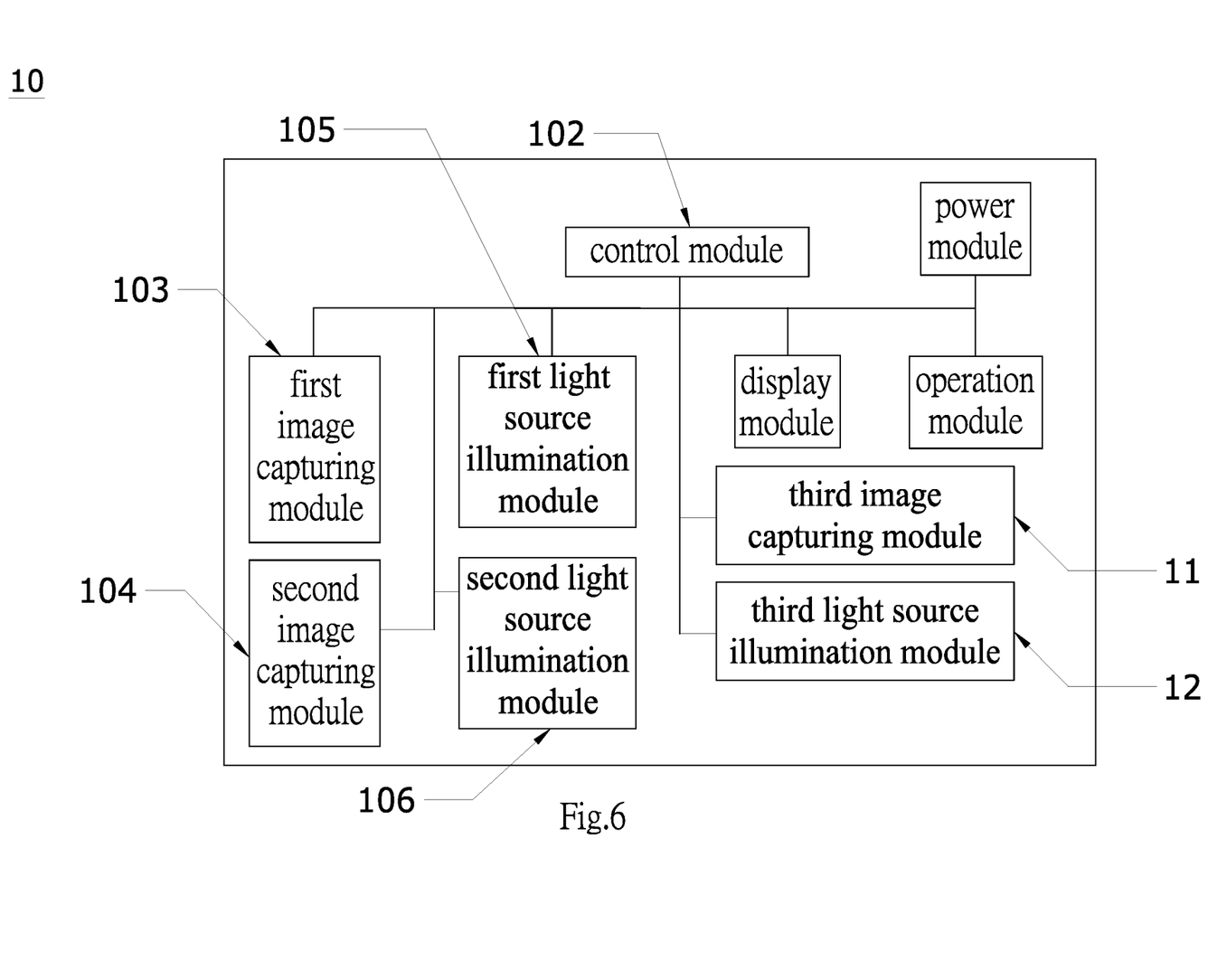
FIG. 6 is a schematic block diagram of a second embodiment of the present disclosure.

As shown in FIG. 6, the control module 102 can be electrically connected with a third image capturing module 11 and a third light source illumination module 12, respectively. The focal range of the third image capturing module 11 should be different with the first image capturing module 103 and the second image capturing module 104 such that the night-viewing device 10 makes the variation of the value of the overall focal range more variation through the combination of different focal ranges among the three image capturing modules (103, 104, 11). The light output angle of the third light source illumination module 12 may be lower or larger than that of the second image capturing module 104 or the first light source illumination module 105 such that the three light source illumination modules (105, 106, 12) mutually match to generate more infrared light with different light angle changes.

Figure 7:
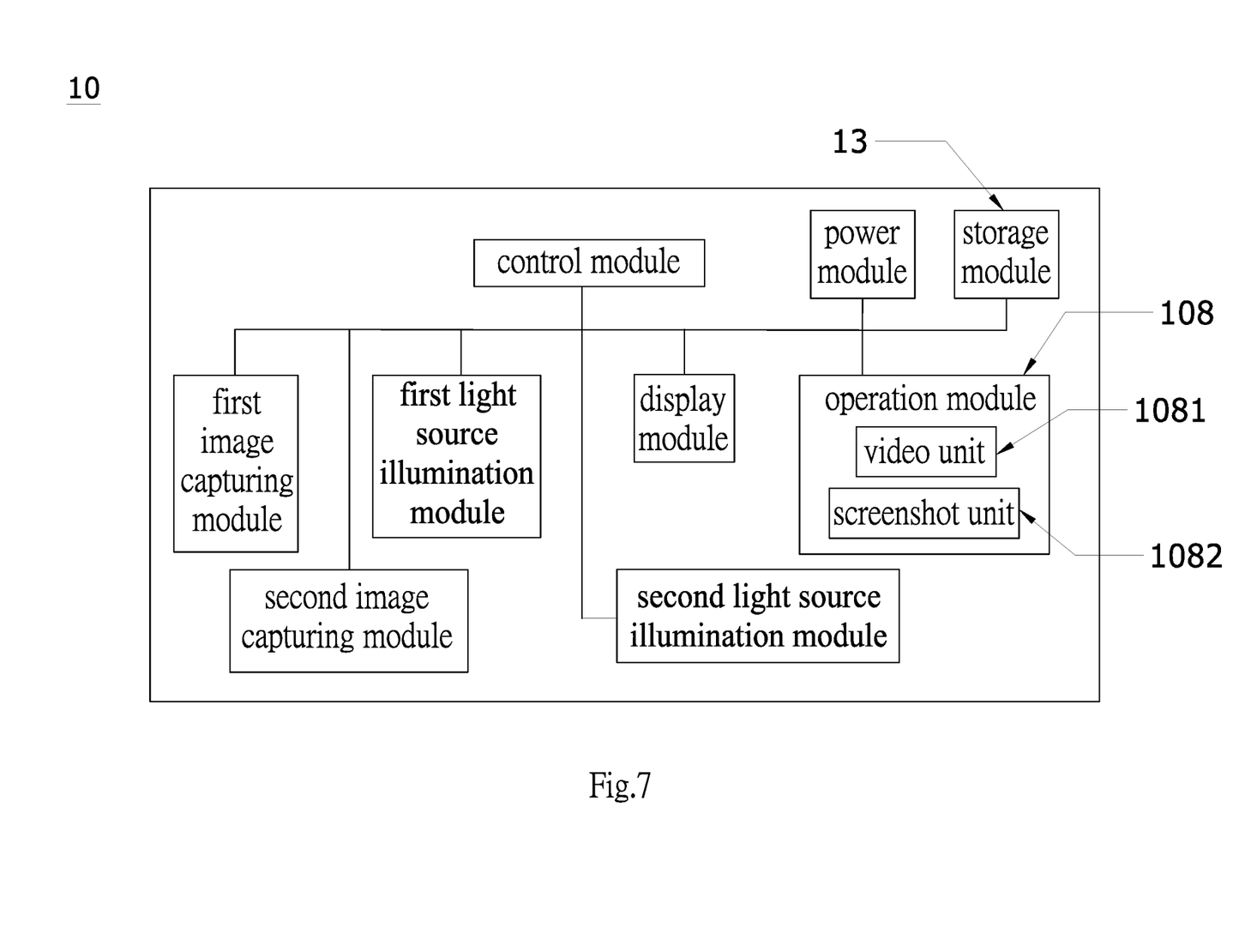
FIG. 7 is a schematic block diagram of a third embodiment of the present disclosure.

As shown in FIG. 7 the operation module 108 can include a video unit 1081 and a screenshot unit 1082. The control module 102 is electrically connected with a storage module 13. The video unit 1081 can record night-viewing images after operation to produce video data. The screenshot unit 1082 can capture night-viewing images to produce picture data. The video data and the picture data can be saved in the storage module 13. The storage module 13 can be fitted inside the night-viewing device 10 in the form of a Hard Disk Drive (HDD). Alternatively, the storage module 13 may be a memory card externally connected to the night-viewing device 10, but not limited thereto.

Figure 8:
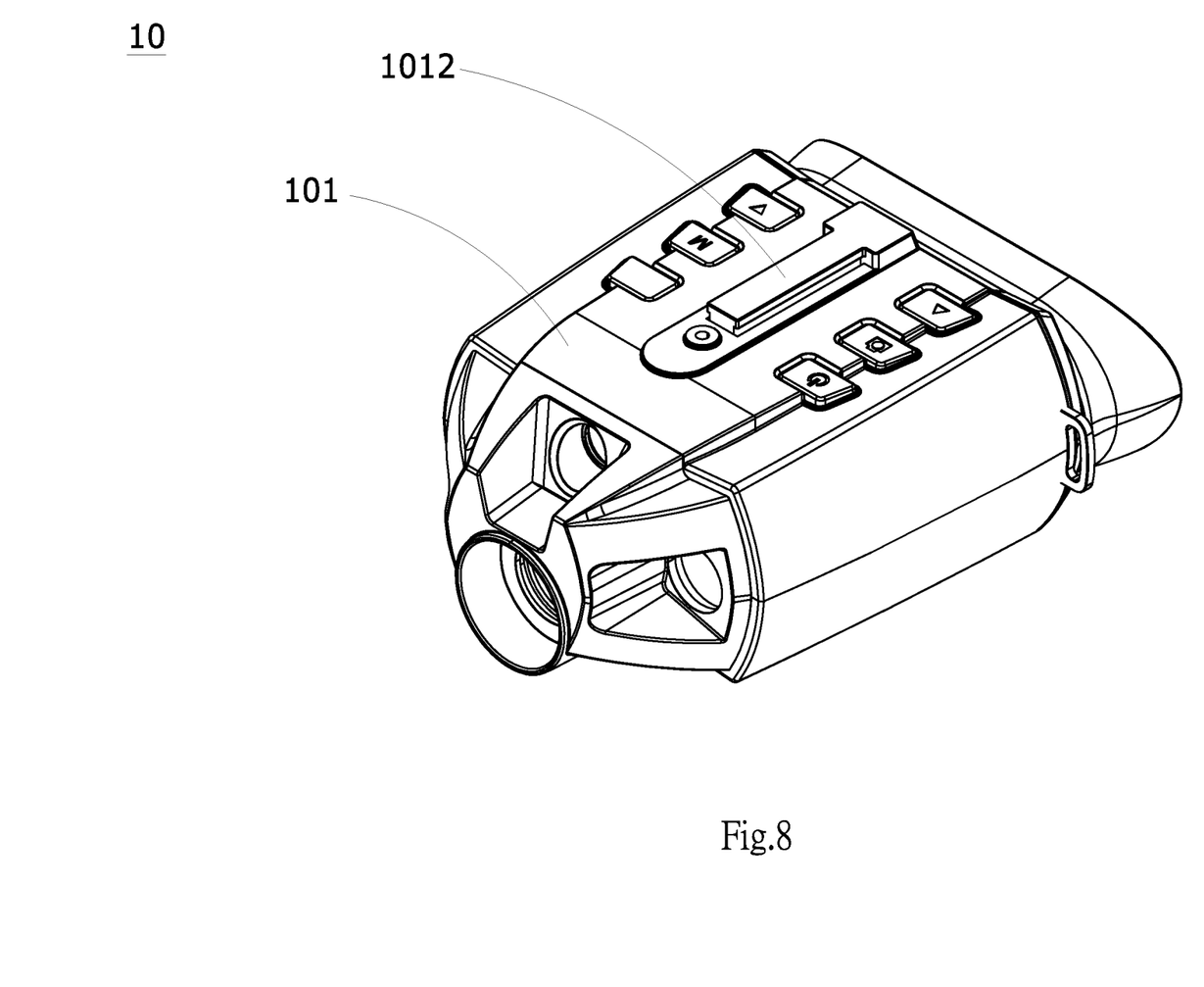
FIG. 8 is a perspective view of a fourth embodiment of the present disclosure.
Figure 9:
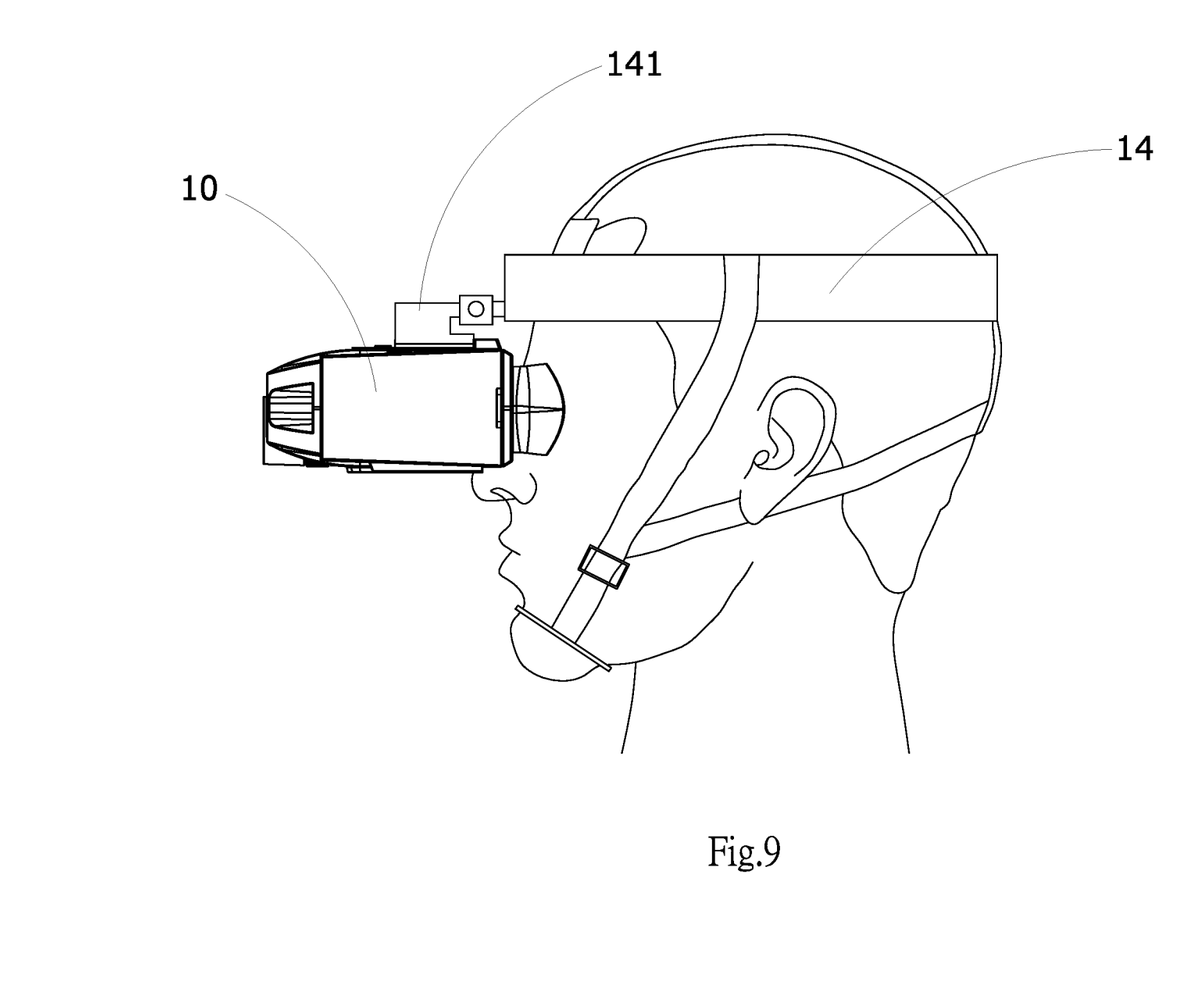
FIG. 9 is a schematic drawing of the fourth embodiment of the present disclosure in use.

As shown in FIG. 8, a connection portion 1012 can be positioned at the outside of the external housing 101 of the night-viewing device 10. As shown in FIG. 9, a head-mounted helmet (HMD) 14 includes a counter portion 141 for assembly with the connection portion 1012 of the night-viewing device 10. In this way, the night-viewing device 10 can be fitted to the head-mounted helmet 14 without problem for use.

Figure 10:
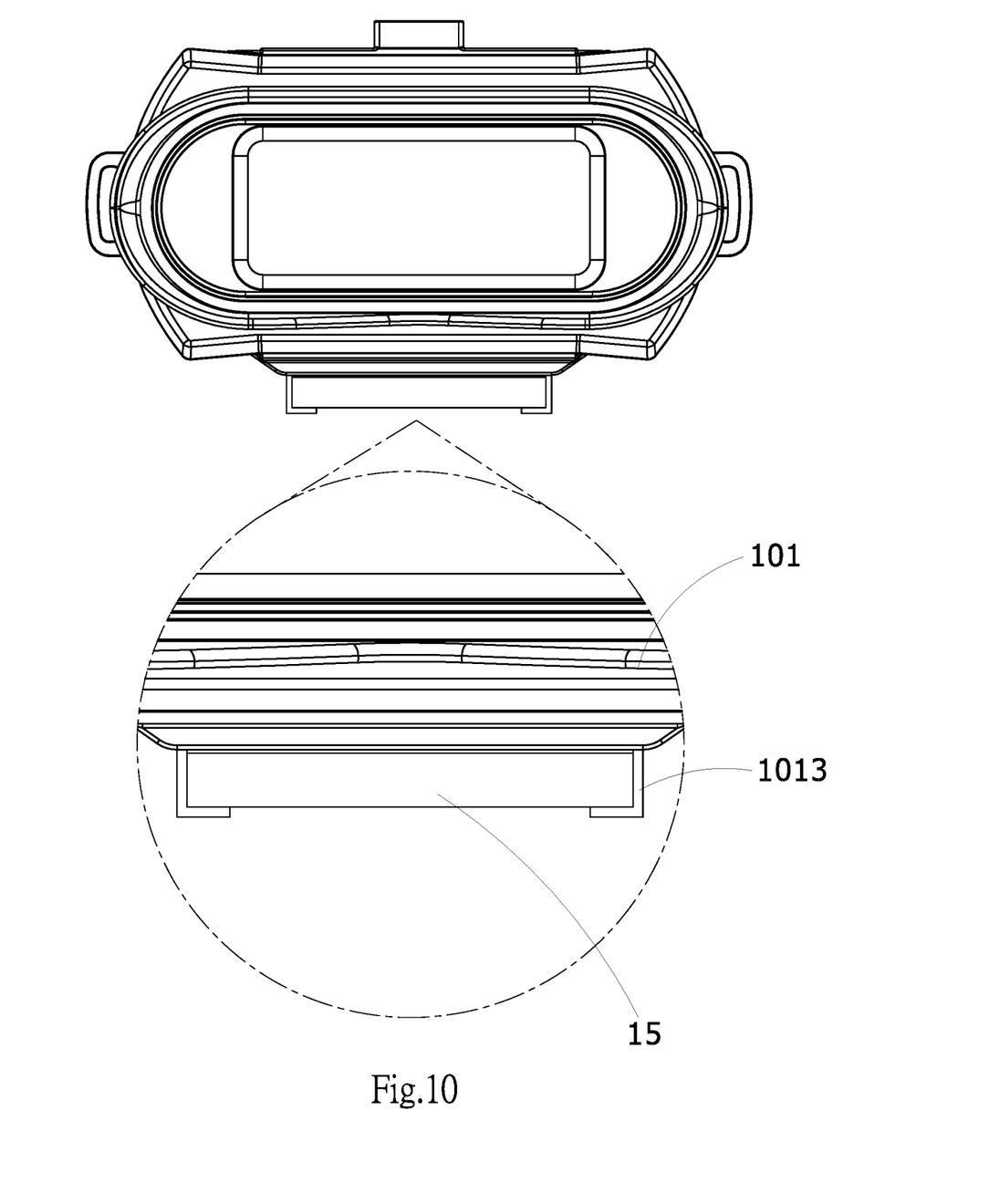
FIG. 10 is a schematic drawing of a fifth embodiment of the present disclosure.

As shown in FIG. 10 together with FIG. 2, a fixing element 1013 can be fitted to the bottom of the external housing 101. The fixing element 1013 can be used for holding an external power supply unit 15 (such as a mobile power supply or power bank). Moreover, the external power supply unit 15 is electrically connected with the power module 109 so that the power module 109 can be supplied with electric power at any time.

In summary, the night-viewing device in accordance with the present disclosure includes a first image capturing module, a second image capturing module, a first light source illumination module and a second light source illumination module. The focal ranges of the two image capturing modules are different. Meanwhile, the light output angles of the two light sources illumination modules are also different. When one of the image capturing modules is driven, a control module can further drive one of the light source illumination modules according to the change of the focal range value of the two image capturing modules. The light output angle of the light source illumination module to be driven is greater than the focal range in operation. When the light source illumination module whose light output angle is greater than the focal range is selected for the operation, the infrared light generated can effectively cover the current focal range, thereby avoiding the excessive darkness around the viewing angle of the captured image. The whole device may be miniaturized for reducing the volume thereof by means of the composition of a plurality of image capturing mini-modules and light source illumination mini-modules. According to the above-mentioned design ideas, it can really achieve the purpose of miniaturizing the overall structure of a night-viewing device with a zoom function and providing a variety of different light output angles to prevent night-viewing devices from excessive darkness at large viewing angles and insufficient lighting distances at small viewing angles.

While the present disclosure has been described by preferred embodiments in conjunction with accompanying drawings, it should be understood that the embodiments and the drawings are merely for descriptive and illustrative purpose, not intended for restriction of the scope of the present disclosure. Equivalent variations and modifications performed by person skilled in the art without departing from the spirit and scope of the present disclosure should be considered to be still within the scope of the present disclosure.

What is claimed is:

1. A night-viewing device for observing an object in an environment lacking a light source, comprising:
    an external housing having a viewing portion at one end thereof;
    a first image capturing module and a second image capturing module, both image capturing modules having different focal ranges and being positioned at the other end of the external housing for capturing night vision image information of the object;
    a first light source illumination module and a second light source illumination module, both light source illumination modules having different light output angles and being respectively disposed adjacent to the first image capturing module and the second image capturing device for respectively generate an infrared light;
    a display module positioned on the opposite side of the viewing portion, the display module being electrically connected to the first image capturing module and the second image capturing module for displaying the night viewing image information captured by the first image capturing module and the second image capturing module;
    a control module electrically connected to the first image capturing module, the second image capturing module, the first light source illumination module and the second light source illumination module for driving the above-mentioned modules to operate; and
    a power module electrically connected with the control module for supplying the electric power required by the night-viewing device;
    wherein, when the first image capturing module and the second image capturing module are activated, the control module is configured to select, in accordance with the change of the focal range, one of the light source illumination modules whose light output angle is greater than the focal range to drive it in operation.

2. The night-viewing device as recited in claim 1, wherein an operation module is electrically connected with the control module, and wherein the operation module is configured to instruct the control module to drive each module to operate after operation.

3. The night-viewing device as recited in claim 2, wherein the control module is electrically connected with a storage module.

4. The night-viewing device as recited in claim 3, wherein the operation module includes a video unit and a screenshot unit.

5. The night-viewing device as recited in claim 1, wherein the first light source illumination module and the second light source illumination module are composed of an infrared light-emitting diode packaged in a condenser lens.

6. The night-viewing device as recited in claim 1, wherein the first light source illumination module and the second light source illumination module having different light output angles correspond to the first light source illumination module and the second light source illumination module having different focal ranges, respectively.

7. The night-viewing device as recited in claim 1, wherein a third image capturing module is electrically connected with the control module and the display module.

8. The night-viewing device as recited in claim 7, wherein a third light source illumination module is electrically connected with the control module.

9. The night-viewing device as recited in claim 1, wherein a connection portion is positioned at the outside of the external housing for assembly with a counter portion of a head-mounted helmet such that the night-viewing device can be fitted to the head-mounted helmet.

10. The night-viewing device as recited in claim 1, wherein a fixing element is fitted to the bottom of the external housing for holding an external power supply unit.

* * * * *